(12) United States Patent
Anderson et al.

(10) Patent No.: US 10,692,230 B2
(45) Date of Patent: Jun. 23, 2020

(54) DOCUMENT IMAGING USING DEPTH SENSING CAMERA

(71) Applicant: NCR Corporation, Duluth, GA (US)

(72) Inventors: Andrew T. Anderson, Duluth, GA (US); Ian McFarlane Denny, Perth (GB)

(73) Assignee: NCR Corporation, Atlanta, GA (US)

( * ) Notice: Subject to any disclaimer, the term of this patent is extended or adjusted under 35 U.S.C. 154(b) by 14 days.

(21) Appl. No.: 15/993,470

(22) Filed: May 30, 2018

(65) Prior Publication Data

US 2019/0370988 A1 Dec. 5, 2019

(51) Int. Cl.
*G06T 7/50* (2017.01)
*G06K 9/00* (2006.01)

(52) U.S. Cl.
CPC ............ *G06T 7/50* (2017.01); *G06K 9/00442* (2013.01); *G06K 2209/01* (2013.01); *G06T 2207/30176* (2013.01)

(58) Field of Classification Search
None
See application file for complete search history.

(56) References Cited

U.S. PATENT DOCUMENTS

| | | | | |
|---|---|---|---|---|
| 7,015,950 B1* | 3/2006 | Pryor | .................... | G06F 3/017 348/207.11 |
| 9,256,719 B2* | 2/2016 | Berini | .................... | G06F 21/32 |
| 10,175,765 B2* | 1/2019 | Wada | .................... | G06F 3/017 |
| 2008/0189173 A1* | 8/2008 | Bakar | .................... | G06Q 30/02 705/14.14 |
| 2008/0212836 A1* | 9/2008 | Fujimura | .................... | G06K 9/00369 382/103 |
| 2011/0293180 A1* | 12/2011 | Criminisi | .................... | G06K 9/38 382/173 |
| 2015/0379720 A1* | 12/2015 | Herraez | .................... | H04N 13/261 348/43 |
| 2016/0110610 A1* | 4/2016 | Ikenoue | .................... | G06T 7/248 382/103 |
| 2016/0275518 A1* | 9/2016 | Bowles | .................... | G06K 9/00087 |
| 2017/0359506 A1* | 12/2017 | Manzari | .................... | H04N 5/262 |

* cited by examiner

*Primary Examiner* — Kate H Luo
(74) *Attorney, Agent, or Firm* — Schwegman, Lundberg & Woessner

(57) ABSTRACT

A self-service terminal, such as an automated teller machine, can have a fascia, a display positioned on the fascia, and a depth sensing camera positioned on the fascia. The camera can capture a video stream of a hand-held document, such as a check, and capture a depth map stream of the hand-held document. A processor positioned in the self-service terminal can sequentially: determine, from the depth map stream, that the document is outside a specified range of distances away from the camera; present, on the display, instructions to reposition the document to be within the specified range of distances away from the camera; determine, from the depth map stream, that the document is within the specified range of distances away from the camera; and automatically capture an image of the document from the video stream.

13 Claims, 6 Drawing Sheets

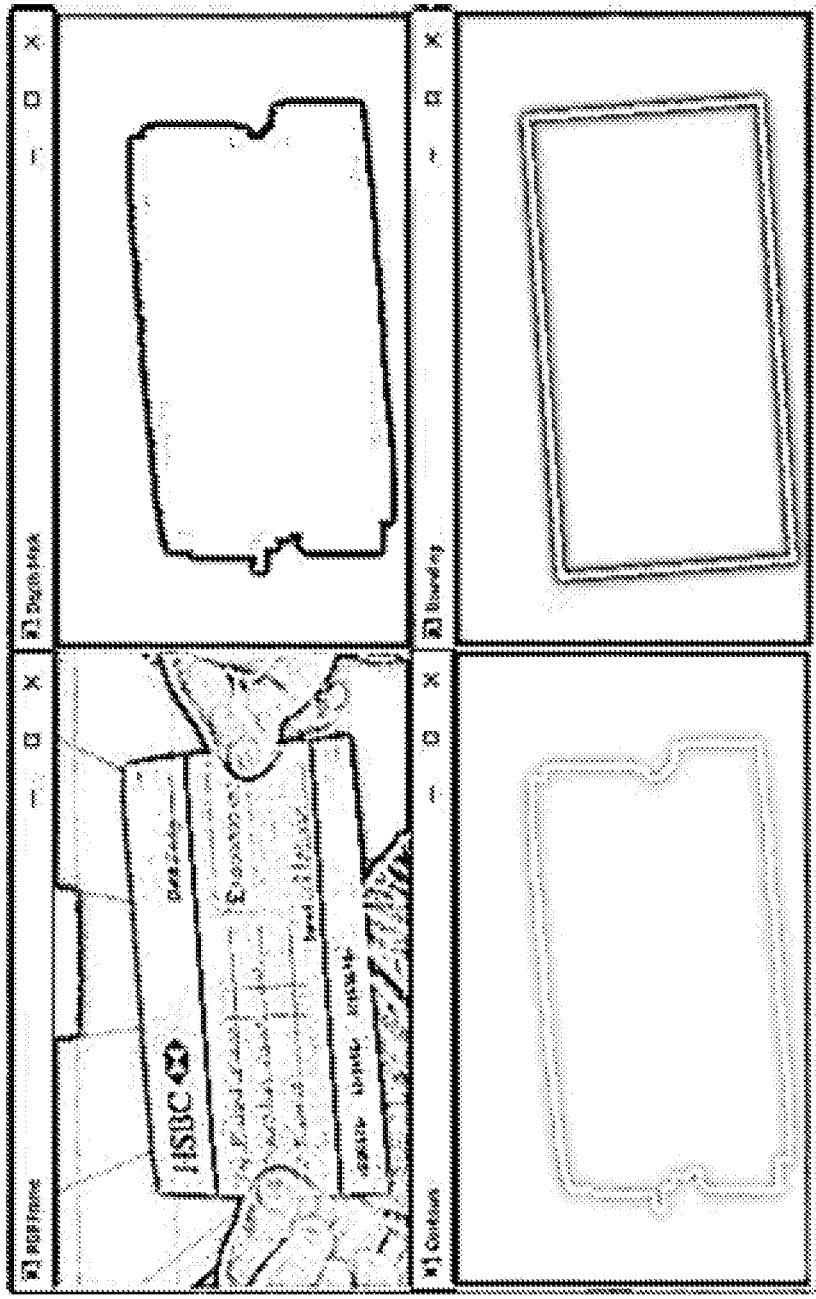
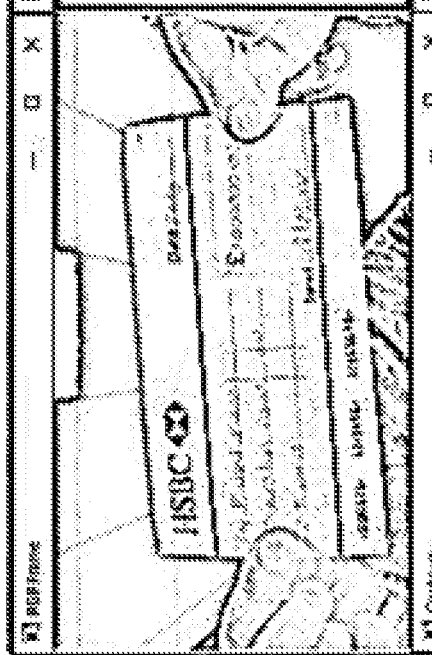
FIG. 4
FIG. 5
FIG. 6
FIG. 7
FIG. 8

US 10,692,230 B2

DOCUMENT IMAGING USING DEPTH SENSING CAMERA

FIELD OF THE DISCLOSURE

The present disclosure relates generally to capturing an image of a hand-held document.

BACKGROUND OF THE DISCLOSURE

It can be beneficial to capture an image of a hand-held document at a self-service terminal. There is ongoing effort to improve the image-capturing mechanism, such as by making it smaller, more robust, and with fewer moving parts.

BRIEF DESCRIPTION OF THE DRAWINGS

FIG. 4 shows an example of a check, in a portion of a video stream, in accordance with some examples.

FIG. 5 shows an example of a virtual mask corresponding to the check of FIG. 4, in accordance with some examples.

FIG. 6 shows an example of a determined outline of the check of FIG. 4, in accordance with some examples.

FIG. 7 shows an example of a bounding rectangle of the check of FIG. 4, in accordance with some examples.

FIG. 8 shows an example of a captured the image of the check of FIG. 4, in accordance with some examples.

Figure 1:
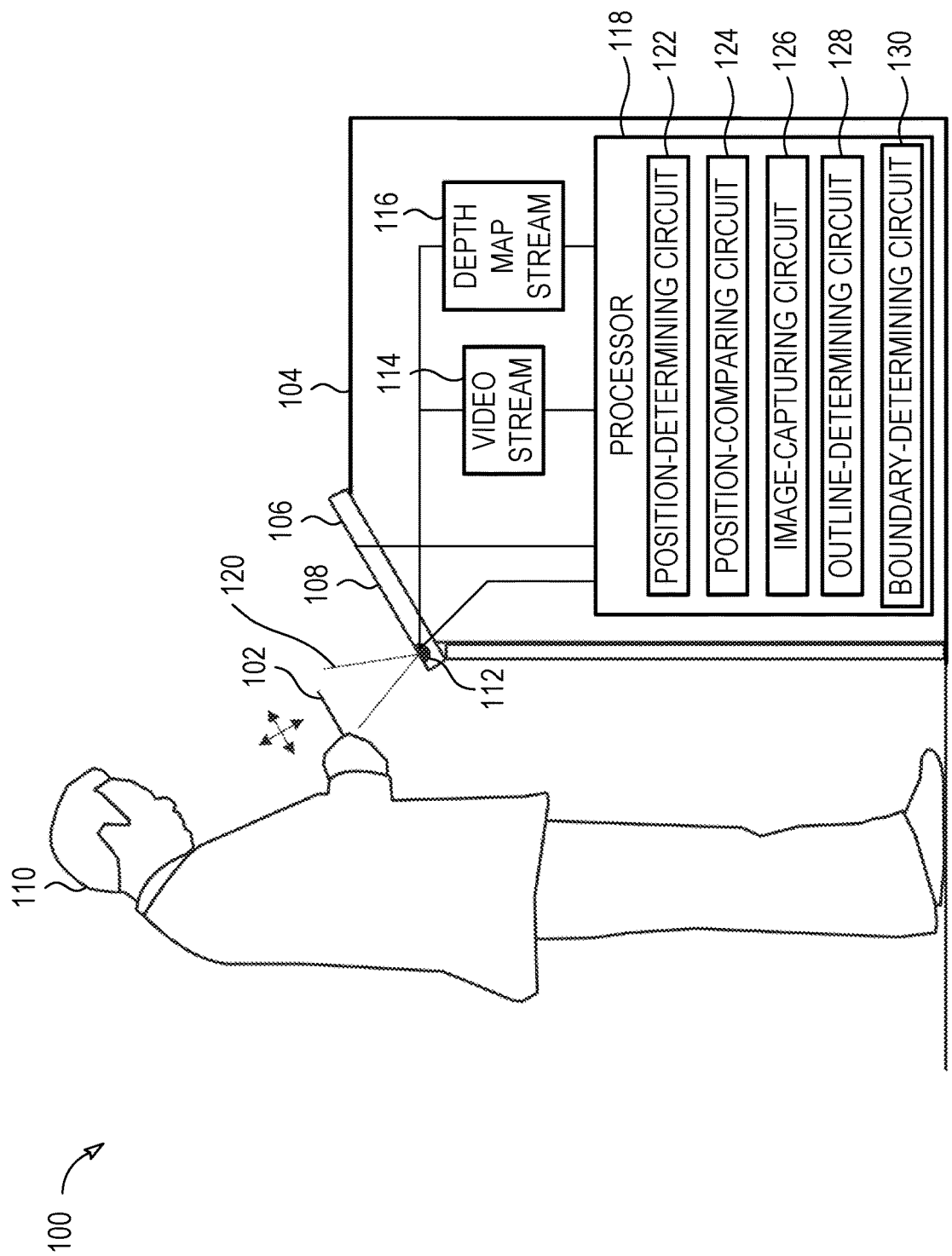
FIG. 1 shows an example of a system that can capture an image of a hand-held document, in accordance with some examples.

Corresponding reference characters indicate corresponding parts throughout the several views. Elements in the drawings are not necessarily drawn to scale. The configurations shown in the drawings are merely examples, and should not be construed as limiting the scope of the inventive subject matter in any manner.

DETAILED DESCRIPTION

For some applications, it can be beneficial for a self-service terminal to capture an image of a document. For example, at an automated teller machine, it can be beneficial to capture an image of a check, and optionally, capture image of supporting documentation, such as a driver's license.

A self-service terminal, such as an automated teller machine, can have a fascia, a display positioned on the fascia, and a depth sensing camera positioned on the fascia. The camera can capture a video stream of a hand-held document, such as a check, and capture a depth map stream of the hand-held document. A processor positioned in the self-service terminal can sequentially: determine, from the depth map stream, that the document is outside a specified range of distances away from the camera; present, on the display, instructions to reposition the document to be within the specified range of distances away from the camera; determine, from the depth map stream, that the document is within the specified range of distances away from the camera; and automatically capture an image of the document from the video stream.

There are benefits to using the depth sensing camera in this manner. For example, positioning the depth sensing camera on the fascia can require relatively little area on the fascia, and relatively little volume behind the fascia. As another example, allowing a user to hold the document, rather than place the document against a pane of glass, can avoid image degradation caused by debris on the glass, can avoid having the document blow away in windy conditions, can require less volume within the self-service terminal, and can afford more flexibility in imaging documents of different size. As yet another example, using a depth sensing camera in this manner, rather than using a slot into which a user inserts the document, can avoid the use of moving parts, can afford more flexibility in imaging documents of different size, and can afford more security because the document never leaves the possession of the user.

FIG. 1 shows an example of a system 100 that can capture an image of a hand-held document 102, in accordance with some examples. The system 100 of FIG. 1 is but one example; other systems can also be used.

The system 100 can include a self-service terminal 104, such as an automated teller machine, or other suitable terminal 104. In some examples, the self-service terminal 104 can be connected to one or more servers through a wired or wireless network. In some examples, the self-service terminal 104 can communicate scanned images to the one or more servers through the wired or wireless network, which can optionally be included with the system 100. In some examples, the self-service terminal 104 can include its own processing capabilities, so that the self-service terminal 104 can perform some or all of the image-acquiring tasks discussed below, without input from the one or more servers.

The self-service terminal 104 can include a fascia 106. The fascia 106 can serve as the user interface with the self-service terminal 104. In some examples, a display 108 positioned on the fascia 106 can provide output to a user 110 and/or instructions to the user 110. In some examples, the display 108 can be touch-sensitive, to receive input from the user 110. In some examples, the fascia 106 can also include one or more buttons for receiving input from the user 110.

A depth sensing camera 112, positioned on the fascia 106, can capture a video stream 114 of a hand-held document 102 and capture a depth map stream 116 of the hand-held document 102. In some examples, the camera 112 can produce two streams of information, including a red/green/blue video stream 114 (with a pixel count of 1920 pixels by 1080 pixels, or another suitable pixel count), and a depth map stream 116. In some examples, the streams can be aligned spatially, so that a lateral location (e.g., x-y pixel location) in the depth map stream 116 can correspond to a lateral location (e.g., x-y pixel location) in the color video stream 114. In some examples, the depth map stream 116 can provide a distance from the camera 112 to each pixel (or group of pixels) within the color video stream 114. In some examples, the depth map stream 116 can be synchronized to the video stream 114. In some examples, the depth map stream 116 and the video stream 114 can have the same frame rate. In some examples, the depth map stream 116 and the video stream 114 can have frame rates that are integral multiples of one another. For example, the video stream 114 can have a frame rate that is twice the frame rate of the depth map stream 116. Other suitable values can also be used, including fractions having integer numerators and integer denominators. In some examples, the video stream 114 can be a three-color video stream 114, such as red/green/blue. Other colors or numbers of colors can also be used. A monochrome grayscale video stream 114 can also be used. In some examples, the depth sensing camera 112 can use time-of-flight information (in a manner similar to lidar) to produce the depth map stream 116, and can use a standard two-dimensional sensor to produce the video stream 114. In other examples, the depth sensing camera 112 can include two two-dimensional cameras 112, which, when combined, can produce a stereo image, in a manner similar to that of a cinematic three-dimensional camera 112. In some examples, the depth sensing camera 112 can be positioned below the display 108 on the fascia 106, so that the depth sensing camera 112 can capture its images at a height and orientation that is convenient for the user 110. In other example, the depth sensing camera 112 can be positioned at another location on the fascia 106, or on the exterior of the self-service terminal 104 away from the fascia 106.

A processor 118 can be positioned in the self-service terminal 104. The processor 118 can be coupled to the display 108, so that the processor 118 can send graphical data to the display 108 for rendering on the display 108, and, for touch-sensitive displays, can receive input on the display 108 from a user 110. The processor 118 can also be coupled to the depth sensing camera 112, and can receive and process the video stream 114 and the depth map stream 116. The processor 118 can also be coupled to one or more servers, via a wired or wireless connection. In some examples, the processor 118 can locally process the video stream 114 and the depth map stream 116 to generate an image of a hand-held document 102, such as a check, and can send the image to the one or more servers.

To scan a document 102, such as a check, a user 110 can hold the document 102 in front of the camera 112. In some examples, the user 110 can position the document 102 such that the document 102 fits completely within a field of view 120 of the camera 112, and is close enough to capture sufficient detail. In some examples, the user 110 can hold the check relatively still to reduce the chances of image blurring. In some examples, the user 110 can ensure that the user's fingertips do not obscure any data on the face of the document 102.

More specifically, to scan a hand-held document 102, some or all the following tasks can be performed. The processor 118 can switch on the depth sensing camera 112. The depth sensing camera 112 can provide two streams of synchronized data, including a two-dimensional color video stream 114, and a corresponding depth map stream 116. The processor 118 can display instructions on the display 108, requesting that the user 110 hold the document 102 facing the depth sensing camera 112, preferably with the user's fingertips avoiding obscuring any information on the document 102. The display 108 can display a live feed of all or a smaller region of the two-dimensional color video stream 114, reversed left-to-right (from the point of view of the camera 112), to assist the user 110 in aligning the document 102 to the depth sensing camera 112. The processor 118 can process the depth map stream 116 to identify the portion of the video frame that contains the document 102 (details below). The processor 118 can create a virtual mask to erase everything except the document 102 from the video frame. The processor 118 can crop the document 102 out of the video frame, and rotate the cropped document 102 to straighten the cropped document 102. The processor 118 can perform image processing on the cropped document 102, to identify if the image is of sufficient quality. In some examples, the processor 118 can make the quality determination by ensuring that the document 102 size and position remain constant over a period of time. In other examples, for which the document 102 is a check, the processor 118 can make the quality determination by performing optical character recognition on a code line portion of the image of the check. If the optical character recognition is successful, the processor 118 can deem the image as being of sufficient quality. The processor 118 can repeat the above tasks on each frame of the two-dimensional color video stream 114, until the processor 118 captures an image of sufficient quality. The processor 118 can end the scan when an image of sufficient quality has been captured.

As a specific example, the processor 118 can sequentially perform the following four tasks.

For the first task, the processor 118 can determine, from the depth map stream 116, that the hand-held document 102 is positioned outside a specified range of distances away from the depth sensing camera 112.

In some examples, the specified range of distances can be defined as follows. The low end of the range can be defined as a distance at which the hand-held document 102 fails to fit within a field of view 120 of the video stream 114. In some examples, this low end of the range can be determined by determining that at least a portion of the hand-held document 102 lies within a specified margin from a peripheral edge of the frame of the video stream 114. The high end of the range can be defined as a distance at which the video stream 114 fails to capture the hand-held document 102 with a resolution greater than a specified threshold resolution. In some examples, this high end of the range can be determined by performing determining optical character recognition of a magnetic ink character recognition code line of the check, and determining that the optical character recognition failed. Other suitable ranges can also be used.

In some examples, the processor 118 can determine that the hand-held document 102 is positioned outside the specified range of distances by performing two tasks. For example, the processor 118 can include a position-determining circuit 122 to determine, from the depth map stream 116, that the hand-held document 102 is at a first distance away from the depth sensing camera 112. The position-determining circuit 122 can be configured purely in software, such as with instructions that execute on the processor 118, purely in hardware, or in a combination of software and hardware. Then, the processor 118 can include a position-comparing circuit 124 to determine that the first distance is outside the specified range of distances away from the depth sensing camera 112. The position-comparing circuit 124 can be configured purely in software, such as with instructions that execute on the processor 118, purely in hardware, or in a combination of software and hardware.

For the second task, the processor 118 can present, on the display 108, indicia corresponding to instructions to reposition the hand-held document 102 to be within the specified range of distances away from the depth sensing camera 112. After the second task, the user 110 can reposition the hand-held document 102.

Figure 2:
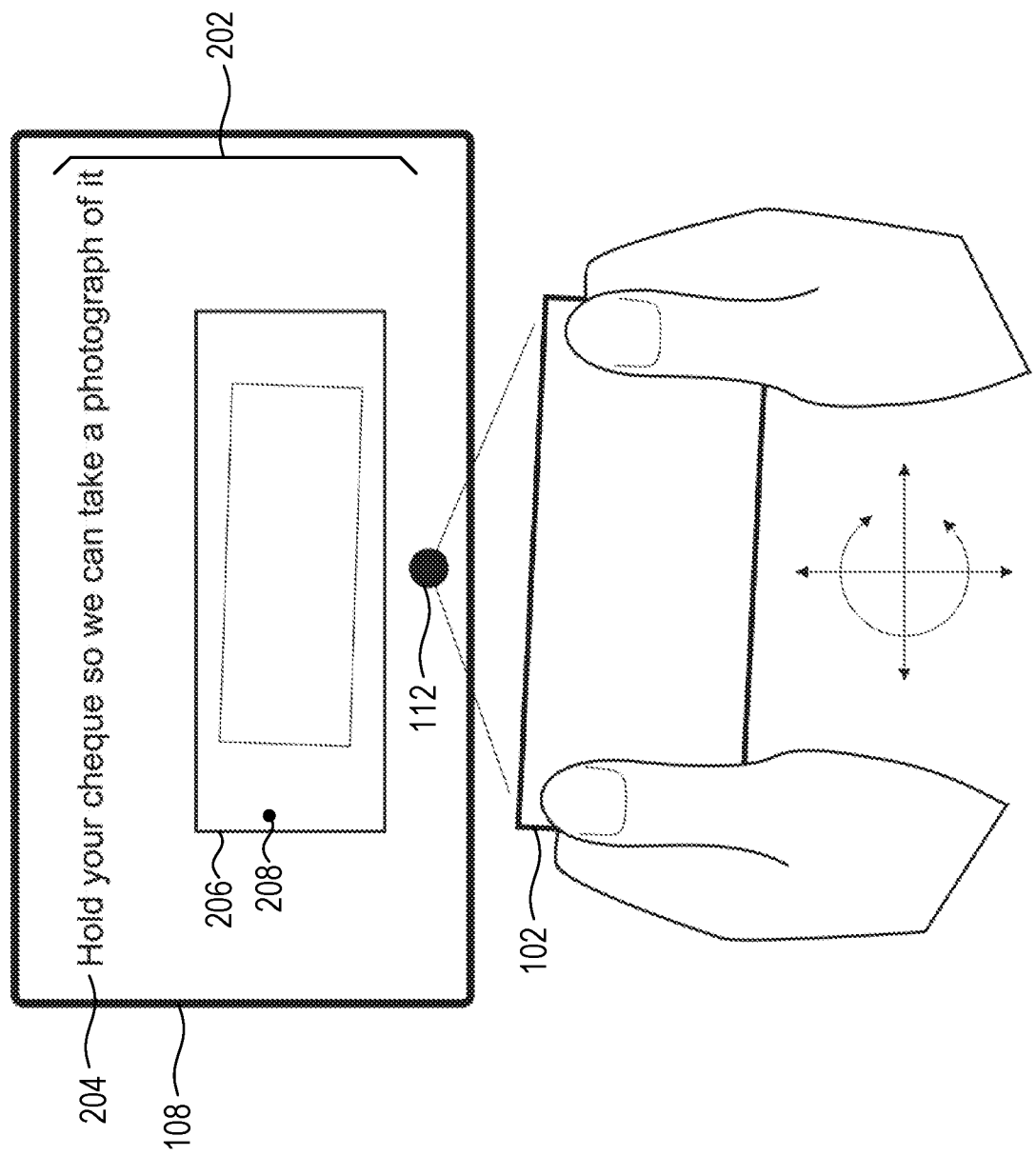
FIG. 2 shows an example of a display showing indicia corresponding to instructions to reposition the hand-held document, in accordance with some examples.

FIG. 2 shows an example of a display 108 showing indicia 202 corresponding to instructions to reposition the hand-held document 102, in accordance with some examples. In some examples, the display 108 can show text-based instructions 204, such as "Hold your cheque so we can take a photograph of it". In some examples, the display 108 can show a guiding rectangle 206, which can remain stationary on the display 108 as the user 110 moves the document 102. In some examples, the display 108 can show a left-right mirror image (from the point of view of the camera 112) of all or a portion 208 of the video stream 114, which can optionally appear in the guiding rectangle 206. Using the portion 208 of the video stream 114 as a guide, the user 110 can position the document 102 to align with the guiding rectangle 206 as best as possible. For example, the user 110 can laterally translate the document 102 (up/down and left/right in FIG. 2), until the image of the document 102 is centered in the guiding rectangle 206. The user 110 can rotate the document 102 (about an axis between the center of the document 102 and the camera 112), until the edges of the document 102 are parallel to the edges of the guiding rectangle 206. The user 110 can longitudinally translate the document 102 (toward or away from the camera 112), until the document size in the portion 208 of the video stream 114 matches the size of the guiding rectangle 206. This longitudinal motion is discussed in more detail below.

Figure 3:
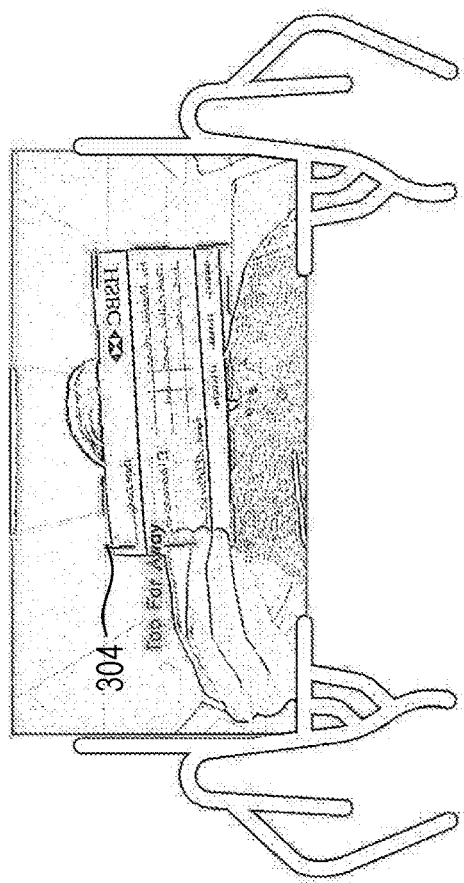
FIG. 3 shows another example of a display showing indicia corresponding to instructions to reposition the hand-held document, in accordance with some examples.

FIG. 3 shows another example of a display 108 showing indicia 302 corresponding to instructions to reposition the hand-held document 102, in accordance with some examples.

In addition to the text-based instructions 204 of FIG. 2, and the left-right mirroring of the video stream 114, the display 108 can additionally display visual assistance superimposed on the left-right mirroring of the video stream 114. For example, the visual assistance can show marker lines along the detected edges of the document 102. In some examples, the visual assistance can include a box or rectangle drawn around the document 102 to indicate to the user 110 that the system 100 is attempting to detect the document 102.

In some examples, indicia 302 corresponding to the instructions can include a colored box 304 around the video image of the hand-held document 102. The colored box 304 can be superimposed on the left-right mirroring of the video stream 114. In some examples, the colored box 304 can be color-coded to indicate an acceptability of a distance from the hand-held document 102 to the depth sensing camera 112. In some examples, the colored box 304 can be further rendered as a dotted line. In some of these examples, the dotted line can have a mark-to-space ratio that corresponds to the acceptability of the distance from the hand-held document 102 to the depth sensing camera 112. In some examples, the visual assistance can optionally further include text-based messages, such as "Too far away".

If the hand-held document 102 is still outside the specified range of distances away from the depth sensing camera 112, then the first and second tasks can repeat. In general, the first and second tasks can repeat until the user 110 positions the hand-held document 102 within the specified range of distances away from the depth sensing camera 112.

Then, returning to FIG. 1 for the third task, the processor 118 can determine, from the depth map stream 116, that the hand-held document 102 is positioned within the specified range of distances away from the depth sensing camera 112. In some examples, the processor 118 can make this determination by performing two tasks. For example, the position-determining circuit 122 of the processor 118 can determine, from the depth map stream 116, that the hand-held document 102 is at a second distance away from the depth sensing camera 112. The position-comparing circuit 124 of the processor 118 can determine that the second distance is within the specified range of distances away from the depth sensing camera 112.

For the fourth task, the processor 118 can include an image-capturing circuit 126 to, after the second distance is determined to be within the specified range of distances away from the depth sensing camera 112, automatically capture an image of the hand-held document 102 from the video stream 114. The image-capturing circuit 126 can be configured purely in software, such as with instructions that execute on the processor 118, purely in hardware, or in a combination of software and hardware.

FIGS. 4-8 show example of some of the various stages involved with capturing the image of the hand-held document. In this example, the hand-held document is a check; it will be understood throughout the discussion below that other hand-held documents can also be used.

FIG. 4 shows an example of a check, in a portion of a video stream, in accordance with some examples. In this portion of the video stream, a user 110 is holding a check. The check is rectangular, and is elongated left-to-right. The user is holding the check at the left and right ends, ensuring that the user's fingers do not obscure any information on the check.

Note that the depth map stream and the video stream both have fields of view that capture the check, where pixels in the depth map stream can be mapped to pixels in the video stream, and vice versa. Because the camera can produce a depth map stream that is aligned spatially with the video stream, the processor can identify a position of a check in the color video stream by using only information from the depth map stream. Specifically, although the processor can extract an outline of the check from either stream, it is found that relying on information from the depth map stream can be beneficial. Identifying a check from just depth information can avoid difficulties with trying to identify a check directly from the video stream, such as insufficient contrast with a user's clothing, insufficient lighting, excessive shadowing, and so forth. In addition, because the depth map stream includes depth information that is absent from the video frame, the processor can use the depth information to identify a relatively flat region as being the check.

In some examples, the processor 118 can include an outline-determining circuit 128 (FIG. 1) to determine an outline of the check. The outline-determining circuit 128 can use information from the depth map stream 116. To identify the edges of the check, the outline-determining circuit 128 can assume that the check is relatively flat, and at least part of the check can occupy a center of the captured image (e.g., a frame of the depth map stream). The outline-determining circuit 128 can be configured purely in software, such as with instructions that execute on the processor 118, purely in hardware, or in a combination of software and hardware.

Regarding the check flatness, in some examples, the outline-determining circuit 128 can identify pixels occupied by a flat surface, where the flat surface can be defined as adjacent pixels that differ in depth by less than a depth threshold value. Identifying pixels in this manner can create a virtual mask, where pixels corresponding to the flat surface are set to white in the mask, and all other pixels are set to black in the mask. In some examples, identifying pixels in this manner can be visualized as a type of flood fill with a dynamic threshold.

As a specific example of identifying the check as being relatively flat, the outline-determining circuit 128 can start with a central pixel at or near the center of the captured image (e.g., a frame of the depth map stream) being a reference pixel. The outline-determining circuit 128 can compare a depth of the central pixel with the depths of adjacent candidate pixels. If the depth difference is less than (or, optionally, equal to) a specified depth threshold value, then the candidate pixel can be deemed to be part of the flat surface and, optionally, set to white in the mask, the reference depth can be updated with the depth of the candidate pixel, the candidate pixel can become the new reference pixel, and the steps can repeat. If the depth difference is greater than (or, optionally, equal to) the specified depth threshold value, then the outline-determining circuit 128 can stop pursuing this pixel path, and can restart with a next available untested pixel.

In some examples, the depth threshold value can be specified within a particular range of values. An upper limit of the depth threshold value can be less than a thickness of user's fingers, so that fingertips are detected as not being part of the flat surface. A lower limit of the depth threshold value should be able to account for reasonable tilts of the document, where the user holds the document at a non-orthogonal orientation, with respect to an optical axis of the camera.

In some examples, the outline-determining circuit 128 can clean up the virtual mask using morphological operations, to correct for inconsistencies caused by holes in the depth data, pixels on the boundary of the threshold value, and others. In some examples, the cleaned-up virtual mask can have the form of a single white object on a black background, where the white object represents the position of the check in the frame.

FIG. 5 shows an example of a virtual mask corresponding to the check of FIG. 4, in accordance with some examples. The interior of the virtual mask (e.g., the area inside the generally rectangular boundary) is white in this example. The exterior of the virtual mask (e.g., the area outside the generally rectangular boundary) is black in this example. The outline-determining circuit 128 can perform an edge detection on the virtual mask of FIG. 5 to generate an outline of the virtual mask, which can correspond to a determined outline of the check.

FIG. 6 shows an example of a determined outline of the check of FIG. 4, in accordance with some examples. Note that the determined outline of the check can exclude a peripheral area of the check that is obscured by one or more fingers. In this example, the obscured peripheral area is along the left and right edges of the check.

In some examples, the outline-determining circuit 128 can perform edge detection and/or contour detection on the (optionally cleaned-up) virtual mask, to determine coordinates for an (optionally rotated) rectangle that can bound the document. In some examples, the processor can use the determined rectangle in downstream processes.

In some examples, the processor 118 can include a boundary-determining circuit 130 to determine the bounding rectangle corresponding to the determined outline of the check. The bounding rectangle can include the peripheral area of the hand-held document that is obscured by the one or more fingers. To account for parallax (e.g. one edge of the check being closer to the camera than an opposite edge of the check), the bounding rectangle can be larger than the check in the video stream, and can include some area around an edge of the check. This can ensure that the full area of the check can be included in the captured image downstream. The boundary-determining circuit 130 can be configured purely in software, such as with instructions that execute on the processor 118, purely in hardware, or in a combination of software and hardware.

FIG. 7 shows an example of a bounding rectangle of the check of FIG. 4, in accordance with some examples.

In some examples, the image of the hand-held document can be rectangular and can capture an area of the video stream defined by the bounding rectangle.

Once the boundary-determining circuit 130 has determined a bounding rectangle, the processor can transfer the determined bounding rectangle to corresponding coordinates in the video stream, and can use the rectangle to crop the document from the full video frame can capture an area of the video stream defined by the bounding rectangle. Because the area of the video stream may be rotated, with respect to horizontal and vertical directions, the processor may additionally rotate the rectangular area of the video stream to be aligned with the horizontal and vertical directions.

FIG. 8 shows an example of a captured the image of the check of FIG. 4, in accordance with some examples. Note that the captured image can be slightly larger than the check along one edge, so that none of the check area is cut off by the imaging. Note also that the user's fingertips are included in the captured image.

For examples in which the self-service terminal is an automated teller machine, and the hand-held document is a hand-held check, the captured image in FIG. 8 can correspond to a first side of the hand-held check. After the image of the first side of the hand-held check is captured, the display can additionally display instructions to flip the hand-held check front-to-back so that a second side of the hand-held check faces the depth sensing camera. The automated teller machine can then repeat the tasks described above for the second side of the check, and can captured a similar image for the second side of the check.

Figure 9:
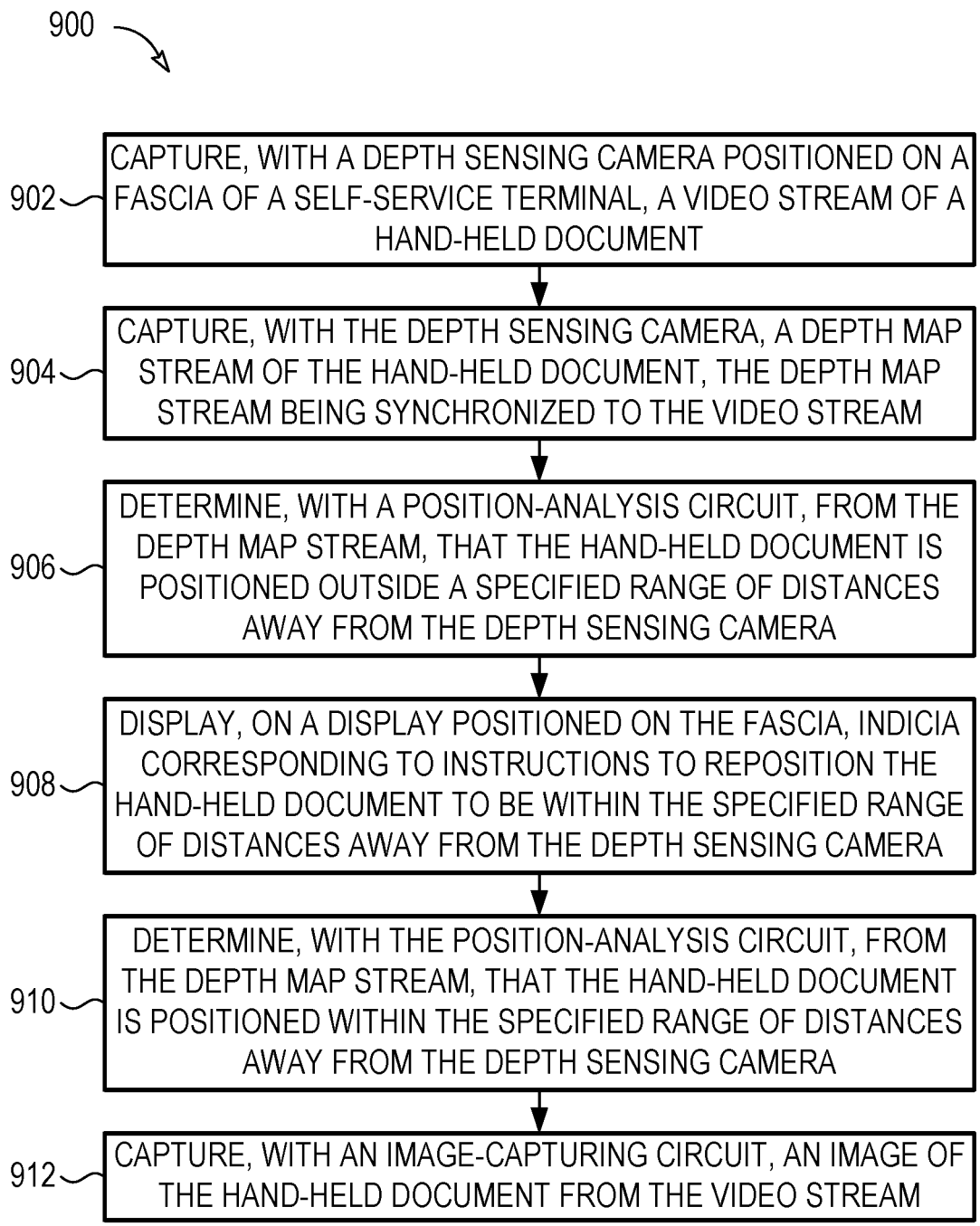
FIG. 9 shows a flowchart of an example of a method that can capture an image of a hand-held document, in accordance with some examples.

FIG. 9 shows a flowchart of an example of a method that can capture an image of a hand-held document, in accordance with some examples. The method can be executed on the system 100 of FIG. 1, or on another suitable system. Other suitable methods for capturing an image of a hand-held document can also be used.

At operation 902, the system can capture, with a depth sensing camera positioned on a fascia of a self-service terminal, a video stream of a hand-held document.

At operation 904, the system can capture, with the depth sensing camera, a depth map stream of the hand-held document, the depth map stream being synchronized to the video stream.

At operation 906, the system can determine, with a position-analysis circuit, from the depth map stream, that the hand-held document is positioned outside a specified range of distances away from the depth sensing camera.

At operation 908, the system can present, on a display positioned on the fascia, indicia corresponding to instructions to reposition the hand-held document to be within the specified range of distances away from the depth sensing camera.

At operation 910, the system can determine, with the position-analysis circuit, from the depth map stream, that the hand-held document is positioned within the specified range of distances away from the depth sensing camera.

At operation 912, the system can automatically capture, with an image-capturing circuit, an image of the hand-held document from the video stream.

In some examples, the method can optionally further include determining, with an outline-determining circuit, an outline of the hand-held document, wherein the determined outline of the hand-held document excludes a peripheral area of the hand-held document that is obscured by one or more fingers. In some examples, the method can optionally further include determining, with a boundary-determining circuit, a bounding rectangle corresponding to the determined outline of the hand-held document, the bounding rectangle including the peripheral area of the hand-held document that is obscured by the one or more fingers. The image of the hand-held document can be rectangular and can capture an area of the video stream defined by the bounding rectangle. In some examples, the outline and bounding rectangle can be determined for every frame in the depth map stream. In other example, the outline and bounding rectangle can be determined for only some frames in the depth map stream, such as for every third frame, every fifth frame, and so forth.

In some examples, the system can automatically recognize the presence of a document, such as a check, being held in front of the camera.

In some examples, the system can automatically determine when an acceptable image has been captured. For example, one set of criteria can ensure that the document fits fully within the field of view of the camera, the resolution of the document is sufficient, and the user's fingertips do not obscure any data on the face of the document. Other suitable criteria can also be used.

In some examples, once the acceptable image has been captured, the document-imaging process can automatically complete.

In some example, after the system has captured a suitable image of the document, the system can crop the detected document from one or more captured video frames, and can apply rotation correction and/or perspective correction to produce a straight (e.g., horizontally aligned or vertically aligned) image of the document.

In some examples that pertain to imaging of checks, the system can perform optional additional functions on the cropped (and optionally straightened) image of the check.

In some examples that pertain to imaging of checks, the system can optionally perform optical character recognition (OCR) of the magnetic ink character recognition (MICR) code line of the check. Performing OCR in this manner can allow the system to identify an orientation of the check. In addition, performing OCR in this manner can provide a gauge of image quality. For example, if the OCR fails to read the MICR code line of the check, such failure could indicate that the image is blurry image, that the user's fingers obscure the MICR code line, and/or the image is of the wrong side of the check.

Similarly, in some examples that pertain to imaging of checks, the system can optionally locate zones in the image for the legal amount and courtesy amount. If the system fails to locate these zones, such failure could indicate that the user's fingers obscure one or both zones.

In some examples that pertain to imaging of two-sided documents, such as checks, the image capture and processing can be performed twice, including once for a front of the check and once for a rear of the check.

In some examples, the system can use a criterion of position to determine if a captured image is acceptable. In some examples, the system can instruct the user to position the document to be within a specified range of distances away from the camera. If the determine depth is outside the specified range, the image can be deemed unacceptable. In some examples, the system can instruct the user to position the document to be positioned within a specified margin from the peripheral edges of the frame. If any part of the document is touching the margin, the image can be deemed unacceptable.

In some examples, the system can use a criterion of stillness to determine if a captured image is acceptable. In some examples, the system can determine a rate of change of depth for the document in the depth map stream. If the rate of change of depth (e.g., a z-coordinate) exceeds (or, optionally, is equal to) a specified depth rate of change, then the system can deem the image to be unacceptable. In some examples, the system can determine a rate of change of lateral position (e.g., an x-, and/or a y-component) for the document in the depth map stream. If the rate of change of position exceeds (or, optionally, is equal to) a specified positional rate of change, then the system can deem the image to be unacceptable. In some examples, because differences in image frame contents, or other processes making use of the CPU, can vary the number of video frames processed per second over time, the system can optionally maintain a time-stamped positional history of each frame processed. In some examples, the system can interrogate this history after each processed frame to determine if the stillness requirement has been met. In some examples, the system can use both position and stillness to determine if the image is acceptable.

In some examples, the system can optionally further use a criterion of image blur to determine if a captured image is acceptable. For example, the system can perform blur detection on an image of a document, which has been cropped out of a color video image frame. Suitable blur detection can include variation of a Laplacian, and/or other suitable blur detection techniques. In some examples, the system can use position, stillness, and blur detection to determine if the image is acceptable. In examples in which there is relatively little detail in the document, such as a rear face of a check, the blur detection can be overridden or disabled, to avoid false positives.

In some examples, the system can provide instructions to the user in the form of visual feedback, displayed on a display that faces the user. In some examples, the visual feedback can instruct or assist the user in positioning the document within the field of view of the camera. Specifically, the visual feedback can guide the user into positioning the document in a manner that allows the system to capture an acceptable image.

In order to avoid overshoot for the user, the visual feedback should be responsive (e.g., with a relatively high refresh rate and/or a relatively low latency). In some examples, the system can enhance the high refresh rate and/or the low latency by offloading imaging processing tasks to a worker thread. Offloading the image processing tasks in this manner can allow the system to obtain video frames from the camera as quickly as possible and send the video frames to the application as quickly as possible.

In some examples, the system can render the visual feedback directly into a feedback video stream (e.g., a video stream generated by the system that is displayed to a user on a user-facing display). By rendering the visual feedback directly into the feedback video stream, the system can avoid performing any other video-rate rendering other than displaying all or a part of each color video frame.

In some examples, the system can generate textual feedback, which can instruct the user that the document is too close or too far from the camera.

In some examples, instead of or in addition to the textual feedback, the system can generate graphical feedback, which can also instruct the user that the document is too close or too far from the camera. In a specific example, the graphical feedback can include a colored bounding box around the detected document. If the image is deemed unacceptable, such as for being too close to or too far from the camera, the box outline can be rendered red with a solid line. If the image is deemed acceptable, the box outline can be drawn in green with a dotted line. A mark/space ratio of the line can decrease as acceptability of the image increases, until it can finally be rendered as a solid green line. In some examples, the feedback video stream can be run at the highest refresh rate that the camera can provide, while the position, color, and dashed character of the bounding box can be updated at a slower rate.

In a specific example, the requirements for an automated teller machine can be as follows. The captured images can capture the front and rear of each check. The captured images can allow all information on the check to be legible. Fingertips in the captured images can be permissible if the fingertips do not obscure any information on the check. The captured images can be cropped to the check edge without losing any information. The image depth (from the color video stream) can be eight-bit color. The image resolution can be 200 dots per inch. The width of a scanned check can be between 120 mm and 225 mm, inclusive. The height of a scanned check can be between 60 mm and 108 mm, inclusive. These requirements and numerical values are but for one specific configuration; other suitable requirements and numerical values can also be used.

Figure 10:
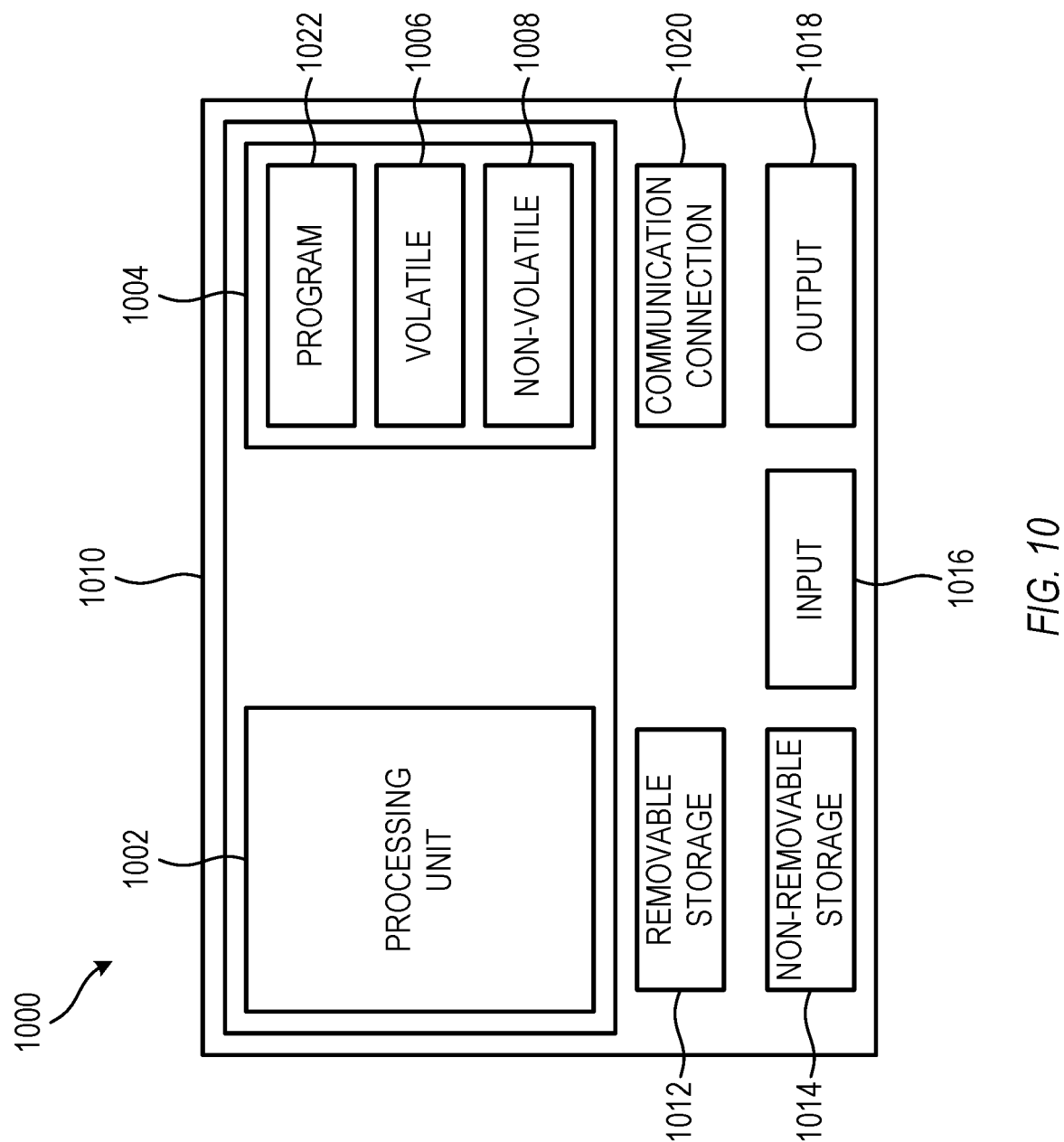
FIG. 10 shows a block diagram of an example of a controller, such as a self-service terminal, in accordance with some embodiments.

FIG. 10 shows a block diagram of an example of a controller 1000, such as a self-service terminal 104, in accordance with some embodiments. The controller 1000 can be part of a system that includes a sleeve, fascia, shutter, actuator, circuitry, optional ratchets, and other optional elements. The example of FIG. 10 is but one configuration for a controller; other configurations can also be used.

In one embodiment, multiple such controllers 1000 are utilized in a distributed network to implement multiple components in a transaction based environment. An object-oriented, service-oriented, or other architecture may be used to implement such functions and communicate between the multiple controllers 1000 and components.

One example of a controller 1000, in the form of a computer 1010, can include a processing unit 1002, memory 1004, removable storage 1012, and non-removable storage 1014. Memory 1004 may include volatile memory 1006 and non-volatile memory 1008. Computer 1010 may include, or have access to a computing environment that includes, a variety of computer-readable media, such as volatile memory 1006 and non-volatile memory 1008, removable storage 1012 and non-removable storage 1014. Computer storage includes random access memory (RAM), read only memory (ROM), erasable programmable read-only memory (EPROM) and electrically erasable programmable read-only memory (EEPROM), flash memory or other memory technologies, compact disc read-only memory (CD-ROM), Digital Versatile Disks (DVD) or other optical disk storage, magnetic cassettes, magnetic tape, magnetic disk storage or other magnetic storage devices, or any other medium capable of storing computer-readable instructions. Computer 1010 may include or have access to a computing environment that includes input 1016, output 1018, and a communication connection 1020. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1002 of the computer 1010. A hard drive, CD-ROM, and RAM are some examples of articles including a non-transitory computer-readable medium. For example, a computer program 1022 with instructions for the computer 1010, according to the teachings of the present disclosure, may be included on a CD-ROM and loaded from the CD-ROM to a hard drive. The computer-readable instructions allow computer 1010 to provide generic access controls in a COM based computer network system having multiple users and servers.

What is claimed is:

1. A self-service terminal, comprising:
   a display positioned on a fascia of the self-service terminal;
   a depth sensing camera, positioned on the fascia, to capture a video stream of a hand-held document and capture a depth map stream of the hand-held document; and
   a processor, positioned in the self-service terminal, to perform data processing activities comprising:
   determining, from the depth map stream received by the processor, that the hand-held document is positioned outside a specified range of distances away from the depth sensing camera;
   presenting, on the display, instructions to reposition the hand-held document to be within the specified range of distances away from the depth sensing camera;
   determining, from the depth map stream, that the hand-held document is positioned within the specified range of distances away from the depth sensing camera;
   automatically capturing an image of the hand-held document from the video stream received by the processor
   determining, from the depth map stream received by the processor, an outline of the hand-held document, wherein determining the outline of the hand-held document comprises determining a group of pixels corresponding to a flat surface, wherein determining the group of pixels corresponding to the flat surface comprises determining that a depth image of each pixel in the group of pixels differs from a depth of an adjacent pixel in the group of pixels by less than a specified depth threshold, wherein the specified depth threshold is less than an average thickness of a human finger, and wherein the determined outline of the hand-held document excludes a peripheral area of the hand-held document that is obscured by one or more fingers.

2. The self-service terminal of claim 1, wherein the data processing activities further comprise:
   determining a bounding rectangle corresponding to the determined outline of the hand-held document, the bounding rectangle including the peripheral area of the hand-held document that is obscured by the one or more fingers;
   wherein the image of the hand-held document is rectangular and captures an area of the video stream defined by the bounding rectangle.

3. The self-service terminal of claim 1, wherein the specified range of distances is defined to exclude a distance value that is either too small to fit the hand-held document within a field of view of the video stream, or too large to capture the hand-held document in the video stream with a resolution greater than a specified threshold resolution.

4. The self-service terminal of claim 3, wherein determining that the distance value is too small to fit the hand-held document within a field of view of the video stream comprises:
  determining that at least a portion of the hand-held document lies within a specified margin from a peripheral edge of the frame of the video stream.

5. The self-service terminal of claim 3, wherein the hand-held document is a check, and wherein determining that the distance value is too large to capture the hand-held document in the video stream with a resolution greater than the specified threshold resolution comprises:
  performing determining optical character recognition of a magnetic ink character recognition code line of the check; and
  determining that the optical character recognition failed.

6. The self-service terminal of claim 1, wherein the self-service terminal is an automated teller machine, the hand-held document is a hand-held check, and the image corresponds to a first side of the hand-held check.

7. The self-service terminal of claim 6, wherein the data processing activities further comprise, after the image of the first side of the hand-held check is captured:
  presenting, on the display, instructions to flip the hand-held check front-to-back so that a second side of the hand-held check faces the depth sensing camera.

8. The self-service terminal of claim 7, wherein the data processing activities further comprise, after the instructions to flip the hand-held check are displayed:
  determining, from the depth map stream, that the second side of the hand-held document is positioned outside the specified range of distances away from the depth sensing camera;
  presenting, on the display, instructions to reposition the second side of the hand-held document to be within the specified range of distances away from the depth sensing camera;
  determining, from the depth map stream, that the second side of the hand-held document is positioned within the specified range of distances away from the depth sensing camera; and
  automatically capturing an image of the second side of the hand-held document from the video stream.

9. The self-service terminal of claim 1, wherein the depth sensing camera is positioned below the display on the fascia.

10. The self-service terminal of claim 1, wherein presenting the instructions to reposition the hand-held document comprises:
  presenting, on the display, a left-right mirroring of the video stream, and
  presenting, on the display, a colored box around the hand-held document, the colored box superimposed on the left-right mirroring of the video stream.

11. The self-service terminal of claim 10, wherein:
  the colored box is color-coded to indicate an acceptability of a distance from the hand-held document to the depth sensing camera, and
  the colored box is further rendered as a dotted line, the dotted line having a mark-to-space ratio that corresponds to the acceptability of the distance from the hand-held document to the depth sensing camera.

12. A method, comprising, sequentially:
  capturing, with a depth sensing camera positioned on a fascia of a self-service terminal, a video stream of a hand-held document;
  capturing, with the depth sensing camera, a depth map stream of the hand-held document, the depth map stream being synchronized to the video stream;
  determining, with a position-analysis circuit, from the depth map stream, that the hand-held document is positioned outside a specified range of distances away from the depth sensing camera;
  presenting, on a display positioned on the fascia, instructions to reposition the hand-held document to be within the specified range of distances away from the depth sensing camera;
  determining, with the position-analysis circuit, from the depth map stream, that the hand-held document is positioned within the specified range of distances away from the depth sensing camera;
  automatically capturing, with an image-capturing circuit, an image of the hand-held document from the video stream
  determining, with an outline-determining circuit, an outline of the hand-held document, wherein the determined outline of the hand-held document excludes a peripheral area of the hand-held document that is obscured by one or more fingers; and
  determining, with a boundary-determining circuit, a bounding rectangle corresponding to the determined outline of the hand-held document, the bounding rectangle including the peripheral area of the hand-held document that is obscured by the one or more fingers;
  wherein the image of the hand-held document is rectangular and captures an area of the video stream defined by the bounding rectangle.

13. A self-service terminal, comprising:
a display positioned on a fascia of the self-service terminal;
a depth sensing camera, positioned on the fascia below the display, to capture a video stream of a hand-held document and capture a depth map stream of the hand-held document;
a position-determining circuit to determine, from the depth map stream, that the hand-held document is at a first distance away from the depth sensing camera;
a position-comparing circuit to determine that the first distance is outside a specified range of distances away from the depth sensing camera;
a display, positioned on the fascia, to present instructions to reposition the hand-held document to be within the specified range of distances away from the depth sensing camera,
wherein the distance-determining circuit is further to determine, from the depth map stream, that the hand-held document is at a second distance away from the depth sensing camera,
wherein the distance-comparing circuit is further to determine that the second distance is within the specified range of distances away from the depth sensing camera;
an image-capturing circuit to, after the second distance is determined to be within the specified range of distances away from the depth sensing camera, automatically capture an image of the hand-held document from the video stream
an outline-determining circuit to determine an outline of the hand-held document, wherein the determined outline of the hand-held document excludes a peripheral area of the hand-held document that is obscured by one or more fingers; and
a boundary-determining circuit to determine a bounding rectangle corresponding to the determined outline of the hand-held document, the bounding rectangle including the peripheral area of the hand-held document that is obscured by the one or more fingers;
wherein the image of the hand-held document is rectangular and captures an area of the video stream defined by the bounding rectangle.

\* \* \* \* \*